United States Patent
Yamamori et al.

(10) Patent No.: US 10,964,961 B2
(45) Date of Patent: Mar. 30, 2021

(54) FUEL CELL SYSTEM

(71) Applicant: TOYOTA JIDOSHA KABUSHIKI KAISHA, Toyota (JP)

(72) Inventors: Keitaro Yamamori, Okazaki (JP); Yosuke Kakimi, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 171 days.

(21) Appl. No.: 16/156,473

(22) Filed: Oct. 10, 2018

(65) Prior Publication Data

US 2019/0148747 A1    May 16, 2019

(30) Foreign Application Priority Data

Nov. 13, 2017  (JP) .............................. JP2017-217880

(51) Int. Cl.

| | |
|---|---|
| *H01M 8/04303* | (2016.01) |
| *H01M 8/0438* | (2016.01) |
| *H01M 8/04537* | (2016.01) |
| *H01M 8/04746* | (2016.01) |
| *H01M 8/04858* | (2016.01) |
| *H01M 8/04828* | (2016.01) |

(52) U.S. Cl.
CPC ..... *H01M 8/04303* (2016.02); *H01M 8/0441* (2013.01); *H01M 8/0491* (2013.01); *H01M 8/0494* (2013.01); *H01M 8/04552* (2013.01); *H01M 8/04753* (2013.01); *H01M 8/04761* (2013.01); *H01M 8/04902* (2013.01); *H01M 2250/20* (2013.01)

(58) Field of Classification Search
None
See application file for complete search history.

(56) References Cited

U.S. PATENT DOCUMENTS

2015/0380753 A1    12/2015  Taruya et al.

FOREIGN PATENT DOCUMENTS

| JP | 2008-004432 | 10/2008 |
|---|---|---|
| JP | 2013-171786 | 9/2013 |
| JP | 2016-012461 | 1/2016 |

*Primary Examiner* — Wyatt P McConnell

(74) *Attorney, Agent, or Firm* — Finnegan, Henderson, Farabow, Garrett & Dunner, LLP

(57) ABSTRACT

In a fuel cell system, a controller is configured to, to stop the fuel cell system, (a) execute an oxidizing gas consumption process by supplying a fuel gas to an anode and sweeping current from a fuel cell while a supply-side on-off valve and an exhaust-side on-off valve are closed to seal the remaining oxidizing gas in the cathode, and (b) stop sweeping the current at a time point at which the difference between pressure of the cathode that decreases in response to the sweeping of the current and an estimated pressure value of the cathode that decreases by consumption of the oxidizing gas remaining in the cathode in response to the sweeping of the current becomes larger than a predetermined determination threshold value to end the oxidizing gas consumption process.

2 Claims, 6 Drawing Sheets

FIG. 4

FUEL CELL SYSTEM

INCORPORATION BY REFERENCE

The disclosure of Japanese Patent Application No. 2017-217880 filed on Nov. 13, 2017 including the specification, drawings and abstract is incorporated herein by reference in its entirety.

BACKGROUND

1. Technical Field

The present disclosure relates to a fuel cell system.

2. Description of Related Art

At the time of stopping a fuel cell system, a process of consuming oxygen remaining in the cathode of the fuel cell (oxygen consumption process) is executed. The oxygen consumption process is a process in which the current is swept in a manner that decreases the output voltage of the fuel cell to control the output voltage until the output voltage lowers to a predetermined voltage value, as described in, for example, Japanese Unexamined Patent Application Publication No. 2016-012461 (JP 2016-012461 A).

SUMMARY

In the oxygen consumption process, the amount of oxygen that could be consumed increases as the predetermined voltage value decreases, that is, as processing time (current sweep time) increases. However, in a case where the process is continued even after the oxygen concentration of the cathode has reached to a low level, hydrogen generation caused by recombination of hydrogen ions and electrons conducted from the anode (hereinafter referred to as "pumping hydrogen") occurs in the cathode. The pumping hydrogen may cause a decrease in fuel consumption and an increase in exhaust hydrogen concentration at the next start. On the other hand, when the processing time is too short, the amount of oxygen not consumed and remaining in the cathode may increase, and thus the purposes of the oxygen consumption process may not be achieved. Thus, it has been desired to achieve both suppression of generation of the pumping hydrogen and sufficient oxygen consumption in the oxygen consumption process at the time of stopping the fuel cell system.

The present disclosure provides a fuel cell system that can be realized as followed embodiments.

An aspect of the disclosure relates to a fuel cell system. The fuel cell system includes a fuel cell, an anode gas supply unit, a cathode gas supply unit, a supply-side on-off valve, an exhaust-side on-off valve, and a controller. The fuel cell generates power using a reaction between a fuel gas supplied to an anode and an oxidizing gas supplied to a cathode. The anode gas supply unit is configured to supply the fuel gas to the anode. The cathode gas supply unit is configured to supply the oxidizing gas to the cathode. The supply-side on-off valve is configured to stop supplying the oxidizing gas to the cathode by the cathode gas supply unit. The exhaust-side on-off valve is configured to shut off cathode off-gas exhausted from the cathode. The controller is configured to control the anode gas supply unit, the cathode gas supply unit, the supply-side on-off valve, and the exhaust-side on-off valve to control power generation of the fuel cell. The controller is configured to, to stop the fuel cell system, (a) execute an oxidizing gas consumption process by supplying the fuel gas to the anode and sweeping current from the fuel cell while the supply-side on-off valve and the exhaust-side on-off valve are closed to seal the remaining oxidizing gas in the cathode, and (b) stop sweeping the current at a time point at which a difference between pressure of the cathode that decreases in response to the sweeping of the current and an estimated pressure value of the cathode that decreases by consumption of the oxidizing gas remaining in the cathode in response to the sweeping of the current becomes larger than a predetermined determination threshold value to end the oxidizing gas consumption process. In the fuel cell system of the embodiment, the time point at which the difference between pressure of the cathode that decreases in response to the current sweep from the fuel cell and the estimated pressure value of the cathode that decreases by consumption of the oxidizing gas (oxygen) remaining in the cathode in response to the current sweep becomes larger than the predetermined determination threshold value corresponds to a time point at which a concentration of oxygen in the cathode reaches to a low level and pumping hydrogen starts to be generated in the cathode. Therefore, by stopping the current sweep at this time point, which can be referred to as "time point at which oxygen concentration reaches to a low level" or "time point at which pumping hydrogen starts to be generated", to end the oxygen consumption process, further suppression of the pumping hydrogen generation and sufficient oxygen consumption in the cathode can be realized.

In the fuel cell system according to the aspect of the present disclosure, the controller may be configured to store, as a voltage threshold value, an output voltage of the fuel cell corresponding to the time point at which the difference between the pressure of the cathode that decreases in response to the sweeping of the current and the estimated pressure value of the cathode becomes larger than the predetermined determination threshold value in advance, and detect the time point at which the difference between the pressure of the cathode and the estimated pressure value of the cathode becomes larger than the predetermined determination threshold value by detecting a time point at which the output voltage of the fuel cell becomes less than the voltage threshold value to stop sweeping the current. In the fuel cell system of the embodiment, the controller detects the time point at which the output voltage of the fuel cell becomes less than the threshold value to detect the time point at which the difference between the pressure of the cathode and the estimated pressure value of the cathode becomes larger than the determination threshold value and subsequently to stop sweeping the current. This configuration allows the current sweep to be stopped easily at the time point at which the oxygen concentration reaches to a low level (time point at which the pumping hydrogen starts to be generated) without requiring detection of the cathode pressure.

The present disclosure can be realized in various forms. For example, the present disclosure can be realized in forms of a method for controlling a fuel cell system, a method for stopping a fuel cell system, and an oxygen consumption method at the time of stopping the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an explanatory diagram showing a schematic configuration of a fuel cell system according to a second embodiment;

DETAILED DESCRIPTION OF EMBODIMENTS

A. First Embodiment

Figure 1:
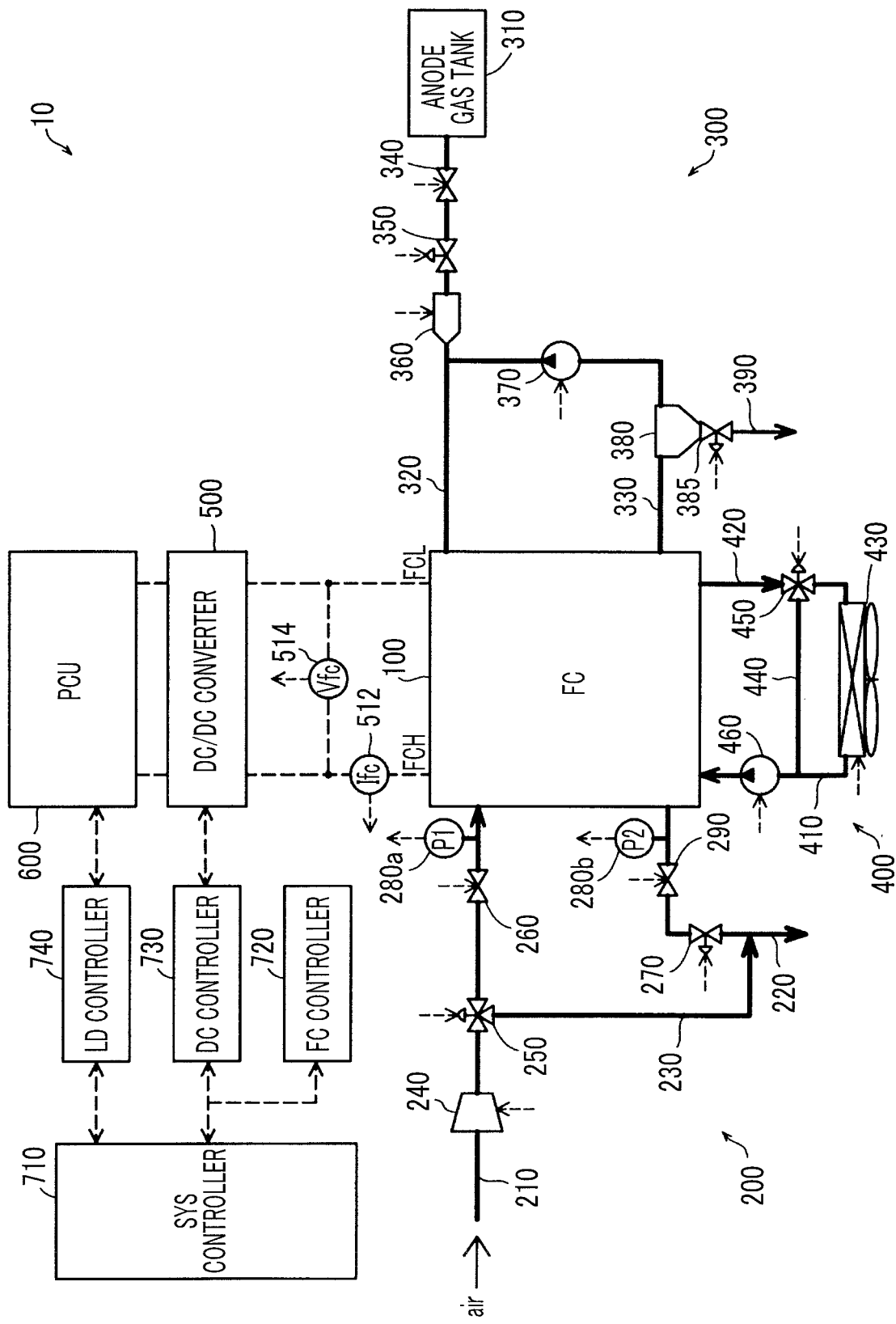
FIG. 1 is an explanatory diagram showing a schematic configuration of a fuel cell system according to a first embodiment of the present disclosure.

FIG. 1 is an explanatory diagram showing a schematic configuration of a fuel cell system 10 according to a first embodiment of the present disclosure. The fuel cell system 10 is mounted on, for example, a vehicle (fuel cell vehicle) and outputs electric power to be a power source of the vehicle in response to a request from a driver. The fuel cell system 10 includes a fuel cell (FC) 100, a cathode gas supply unit 200, an anode gas supply unit 300, a FC cooling unit 400, a DC/DC converter 500, a power control unit 600, a SYS controller 710, a FC controller 720, a DC controller 730, a LD controller 740, a FC current sensor 512, and a FC voltage sensor 514. The power control unit 600 is hereinafter also referred to as "PCU 600".

The fuel cell 100 has a stack structure in which a plurality of unit cells (not shown) is stacked as power generation elements. The unit cell is constituted by a membrane electrode assembly and two separators sandwiching an anode and a cathode of the membrane electrode assembly from the opposite sides. The anode and the cathode include a carbon material as electrode catalyst carrier. The fuel cell 100 generates power using an electrochemical reaction between hydrogen as fuel gas supplied to the anode and oxygen as oxidizing gas supplied to the cathode.

The anode gas supply unit 300 supplies hydrogen gas (fuel gas) as an anode gas to the anode of the fuel cell 100. The anode gas supply unit 300 includes an anode gas tank 310, an anode gas supply pipe 320, an anode gas reflux pipe 330, a main stop valve 340, a pressure-regulating valve 350, an injector 360, an anode gas pump 370, a gas-liquid separator 380, an exhaust-and-drain valve 385, and an exhaust-and-drain pipe 390.

The anode gas tank 310 stores high-pressure hydrogen gas, for example. The anode gas tank 310 is connected to the anode of the fuel cell 100 through the anode gas supply pipe 320. The main stop valve 340, the pressure-regulating valve 350, and the injector 360 are provided on the anode gas supply pipe 320, in this order from the anode gas tank 310 side. The main stop valve 340 turns on and off the anode gas supply from the anode gas tank 310. The pressure-regulating valve 350 regulates the pressure of the anode gas supplied to the injector 360. The injector 360 injects the anode gas supplied from the pressure-regulating valve 350 toward the anode of the fuel cell 100 through the anode gas supply pipe 320.

The anode gas reflux pipe 330 is connected to the fuel cell 100 and the anode gas supply pipe 320, and anode off-gas exhausted from the fuel cell 100 is refluxed to the anode gas supply pipe 320 as the anode gas (fuel gas). The gas-liquid separator 380 and the anode gas pump 370 are provided on the anode gas reflux pipe 330. The gas-liquid separator 380 separates liquid water from the anode off-gas with the liquid water exhausted from the fuel cell 100. Impurity gas contained in the anode off-gas, for example, nitrogen gas is also separated together with the liquid water. The gas obtained by separating the impurity gas from the anode off-gas (unused hydrogen gas) is driven by the anode gas pump 370, and is refluxed to the anode gas supply pipe 320 through the anode gas reflux pipe 330 as the anode gas. The separated liquid water and nitrogen gas are exhausted to the outside the system passing through the exhaust-and-drain valve 385 and the exhaust-and-drain pipe 390 connected to the gas-liquid separator 380. The main stop valve 340, the pressure-regulating valve 350, the injector 360, and the anode gas pump 370 are controlled by the FC controller 720.

The cathode gas supply unit 200 supplies cathode gas to the fuel cell 100 and exhausts the cathode off-gas. In the example of FIG. 1, air containing oxygen as the oxidizing gas is employed as the cathode gas. The cathode gas supply unit 200 includes a cathode gas supply pipe 210, a cathode gas exhaust pipe 220, a bypass pipe 230, an air compressor 240, a flow dividing valve 250, a supply-side on-off valve 260, a pressure-regulating valve 270, an exhaust-side on-off valve 290, a supply-side pressure sensor 280a, and an exhaust-side pressure sensor 280b.

One end of the cathode gas supply pipe 210 is connected to a supply inlet to the cathode of the fuel cell 100, and the external air is guided to the cathode of the fuel cell 100. In the cathode gas supply pipe 210, the air compressor 240, the flow dividing valve 250, the supply-side on-off valve 260, and the supply-side pressure sensor 280a are provided in this order from the side where the air is taken from. The air compressor 240 compresses and outputs the intake air. The flow dividing valve 250 is connected to the bypass pipe 230 and regulates the flow rate of the cathode gas to the fuel cell 100 and the bypass pipe 230. The supply-side on-off valve 260 shuts off the supply of the cathode gas to the fuel cell 100. The supply-side pressure sensor 280a detects the pressure of the gas in the supply inlet of the cathode of the fuel cell 100. The bypass pipe 230 is connected to the cathode gas exhaust pipe 220. In addition, on the upstream side of the air compressor 240 of the cathode gas supply pipe 210, a temperature sensor for detecting the temperature of the intake air, an air flow meter for detecting the amount of the intake air, or the like (not shown) are provided.

The upstream side end of the cathode gas exhaust pipe 220 is connected to an outlet of the cathode of the fuel cell 100, and the cathode gas exhaust pipe 220 has a middle portion connected to the bypass pipe 230. The cathode gas exhaust pipe 220 exhausts the cathode off-gas exhausted from the fuel cell 100 and the cathode gas (air) divided and flown into the bypass pipe 230 to the outside. In the cathode gas exhaust pipe 220, the exhaust-side pressure sensor 280b, the exhaust-side on-off valve 290, and the pressure-regulating valve 270 are provided in this order from the fuel cell 100 side. The pressure-regulating valve 270 is positioned closer to the fuel cell 100 than the connecting portion between the cathode gas exhaust pipe 220 and the bypass pipe 230. The pressure-regulating valve 270 regulates the pressure of the cathode gas supplied into the fuel cell 100. The exhaust-side on-off valve 290 shuts off the cathode off-gas from the fuel cell 100. The exhaust-side pressure sensor 280b detects the pressure of the gas at the outlet of the cathode of the fuel cell 100. Although not shown in the drawing, the cathode gas exhaust pipe 220 on the downstream side is connected to the downstream portion of the exhaust-and-drain pipe 390 of the anode gas supply unit 300 and exhausts the remaining gas and the liquid water exhausted from the exhaust-and-drain pipe 390 to the outside.

The cathode gas supply unit 200 introduces air (cathode gas) to inside of the system using the air compressor 240, supplies the air to the fuel cell 100, and then exhausts unused air (cathode off-gas) to outside of the system. As will be described later, at the time of stopping the fuel cell system 10, the cathode gas supply unit 200 stops the cathode gas supply from the cathode gas supply unit 200 to the cathode of the fuel cell 100 by closing the supply-side on-off valve 260 and the exhaust-side on-off valve 290, and shuts off the cathode off-gas from the cathode of the fuel cell 100. This configuration allows the cathode of the fuel cell 100 to be sealed while the fuel cell system 10 is being stopped. The air compressor 240, the flow dividing valve 250, the supply-side on-off valve 260, the pressure-regulating valve 270, and the exhaust-side on-off valve 290 are controlled by the FC controller 720.

The FC cooling unit 400 cools the fuel cell 100. The FC cooling unit 400 includes a coolant supply pipe 410, a coolant exhaust pipe 420, a radiator 430, a bypass pipe 440, a three-way valve 450, and a coolant pump 460. Examples of the coolant to be used include water, antifreeze such as ethylene glycol, and air. The present embodiment employs an antifreeze solution. For example, the radiator 430 is disposed at the front end of a front compartment of a vehicle in which the fuel cell system 10 is accommodated, and cools the coolant heated by the exhaust heat of the fuel cell 100 and exhausted through the coolant exhaust pipe 420 using cooling air taken from the front side. The coolant pump 460 is provided on the coolant supply pipe 410 and supplies the coolant cooled by the radiator 430 to the fuel cell 100. The three-way valve 450 regulates the flow rate of the coolant to the radiator 430 and the bypass pipe 440. The radiator 430, the three-way valve 450, and the coolant pump 460 are controlled by the FC controller 720.

The DC/DC converter 500 boosts the voltage output from the fuel cell 100 under the control of the DC controller 730 and supplies the boosted voltage to the PCU 600. The PCU 600 has an inverter inside and supplies power to a load (not shown) under the control of the LD controller 740.

The FC voltage sensor 514 detects the output voltage (hereinafter also referred to as "FC voltage") Vfc of the fuel cell 100. The FC current sensor 512 detects the output current (hereinafter also referred to as "FC current") Ifc of the fuel cell 100. The value of the detected FC voltage Vfc and the value of the detected FC current Ifc are acquired by the FC controller 720 and used for controlling the FC controller 720 and the DC controller 730.

The SYS controller 710 is a general controller for generally controlling the FC controller 720, the DC controller 730, and the LD controller 740 in order to control the operations of the units in the fuel cell system 10.

The FC controller 720 controls the cathode gas supply unit 200, the anode gas supply unit 300, and the FC cooling unit 400 according to the instruction from the SYS controller 710 to control the operation (power generation) and stop of the fuel cell 100. In particular, the FC controller 720 executes an oxygen consumption process to be described later at the time of stopping the power generation of the fuel cell 100 in stopping the fuel cell system 10.

The DC controller 730 controls the DC/DC converter 500 according to the instruction from the SYS controller 710 and the FC controller 720. The LD controller 740 controls the PCU 600 according to the instruction from the SYS controller 710.

The SYS controller 710, the FC controller 720, the DC controller 730, and the LD controller 740 each are configured as a computer including a CPU, a RAM, and a nonvolatile memory, which may be specified as an electronic control unit (ECU). The controllers execute the above-described respective functions by executing software stored in their memory.

Figure 2:
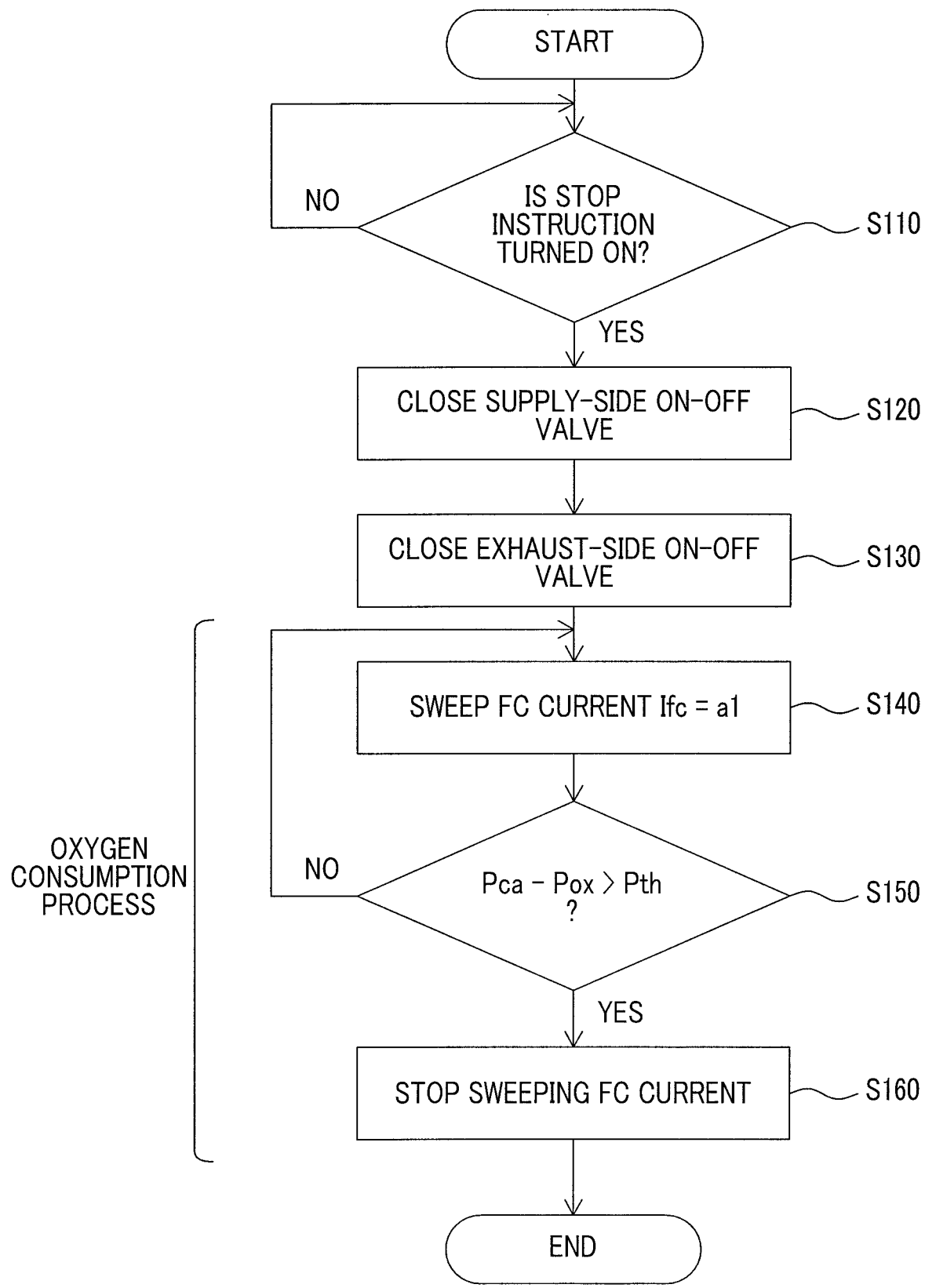
FIG. 2 is a flowchart showing a procedure of an oxygen consumption process executed at the time of stopping the fuel cell system.

FIG. 2 is a flowchart showing a procedure of the oxygen consumption process executed at the time of stopping the fuel cell system 10. The oxygen consumption process is executed by the FC controller 720.

The FC controller 720 waits until a stop instruction is turned ON (step S110). The FC controller 720 determines whether or not the stop instruction is turned ON, for example, as follows. In a case where the SYS controller 710 receives a stop signal generated by user activation of a switch for stopping the system, the SYS controller 710 issues the stop instruction to the FC controller 720. The FC controller 720 determines that the stop instruction is turned ON by receiving the stop instruction.

In a case where the stop instruction is turned ON (step S110: YES), the FC controller 720 closes the supply-side on-off valve 260 (step S120) and closes the exhaust-side on-off valve 290 (step S130) to seal the cathode of the fuel cell 100. In this case, the operation of the air compressor 240 also stops. In closing the supply-side on-off valve 260, it is desirable that the FC controller 720 is set to fully open the flow dividing valve 250 to the bypass pipe 230 side in advance such that the cathode gas does not flow into the supply-side on-off valve 260 from the flow dividing valve 250.

The FC controller 720 sweeps current at the FC current Ifc=a1 from the fuel cell 100 to start the oxygen consumption process (step S140) by controlling the DC/DC converter 500 through the DC controller 730. At this time, operation conditions of the anode gas pump 370, the injector 360, and the pressure-regulating valve 350 are set in the anode gas supply unit 300 such that the anode gas supply unit 300 supplies the needed anode gas for sweeping the current at the FC current Ifc=a1 from the fuel cell 100. The expression "current sweep" means to cause a predetermined amount of current to be swept from the fuel cell 100.

Then, the FC controller 720 measures the cathode pressure Pca and determines whether or not the cathode pressure Pca has become larger than the estimated pressure value Pox by more than a determination threshold value Pth (step S150). Specifically, the FC controller 720 determines whether or not the difference between the cathode pressure Pca and the estimated pressure value Pox has become larger than the determination threshold value Pth. The cathode pressure Pca is obtained by averaging the pressure value P1 measured by the supply-side pressure sensor 280a and the pressure value P2 measured by the exhaust-side pressure sensor 280b. The pressure value P1 measured by the supply-side pressure sensor 280a and the pressure value P2 measured by the exhaust-side pressure sensor 280b are basically the same. However, since some deviation and measurement error may occur in the process of the oxygen consumption reaction, averaging the respective values can improve the measurement accuracy.

As long as the difference between the cathode pressure Pca and the estimated pressure value Pox is equal to or less than the determination threshold value Pth (step S150: NO), the FC controller 720 continues to sweep the current in step S140. On the other hand, at the time point at which the difference between the cathode pressure Pca and the estimated pressure value Pox becomes larger than the determination threshold value Pth, in other words, at the time point at which the cathode pressure Pca becomes larger than the estimated pressure value Pox by more than the determination threshold value Pth (step S150: YES), the FC controller 720 stops sweeping the FC current (step S160) and ends the oxygen consumption process.

Figure 3:
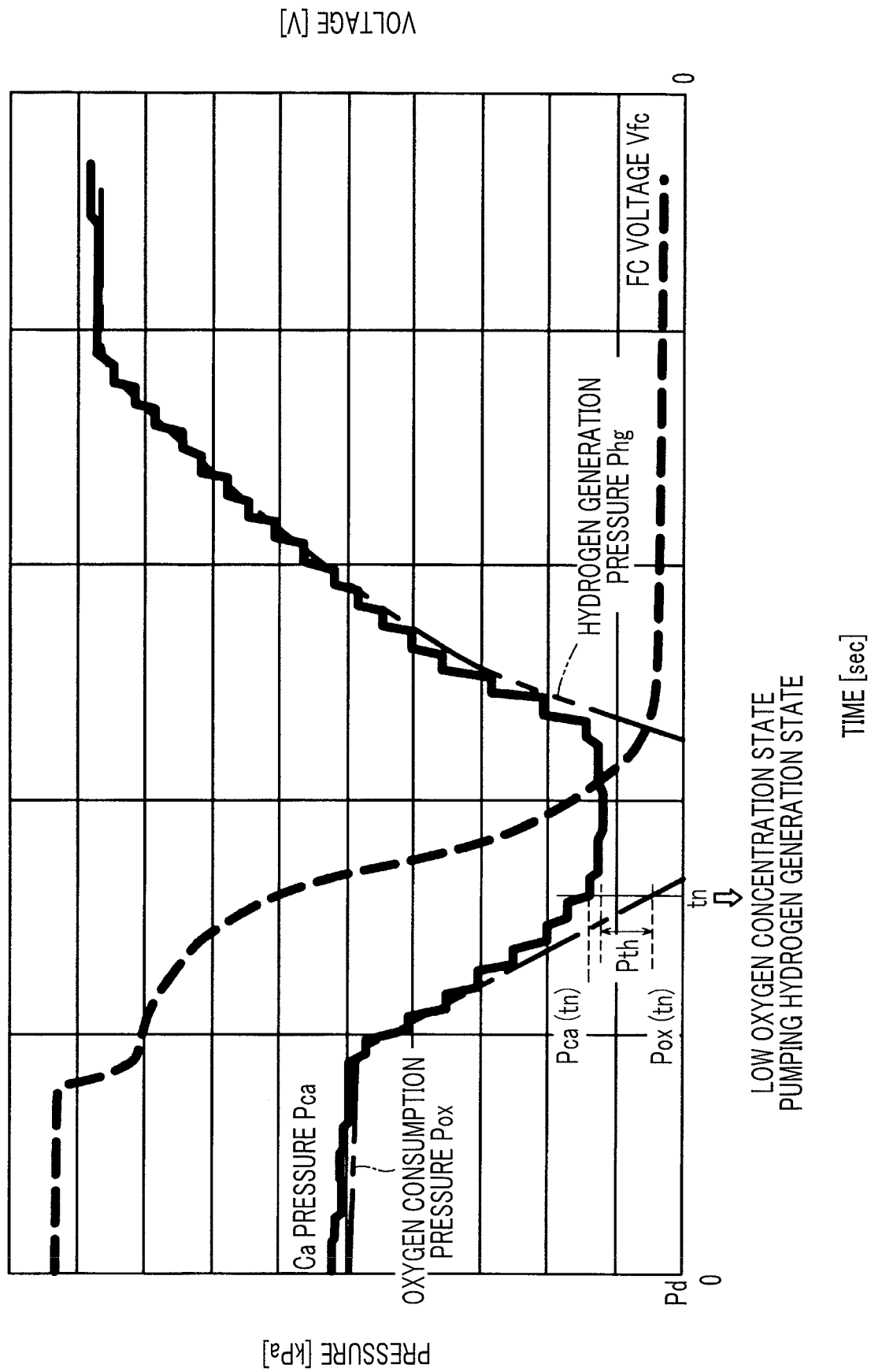
FIG. 3 is a graph showing how an FC voltage and a cathode pressure changes in the oxygen consumption process.

FIG. 3 is a graph showing how the FC voltage Vfc and the cathode pressure Pca changes in the oxygen consumption process. FIG. 3 shows the FC voltage Vfc (thick broken line in FIG. 3) and the cathode pressure (Ca pressure) Pca (thick solid line in FIG. 3), which were measured under the condition that the current is started to be swept at the FC current Ifc=a1 while the cathode is sealed, and the current is continuously swept until the correspondingly lowered FC voltage Vfc converges to a value close to 0 V (for example, value of 0.1 V or less), which can be safely regarded as 0 V. The measurement of the FC voltage Vfc and the cathode pressure Pca is repeated at a predetermined measurement interval.

The reaction formula when oxygen sealed in the cathode is consumed in response to the current sweep is as shown in the following formula (1), and 1 mole of oxygen is consumed for 4 moles of electric charge.

$$O_2 + 4H^+ + 4e^- \rightarrow 2H_2O \tag{1}$$

The reaction formula when the pumping hydrogen is generated by the reaction at the cathode is as shown in the following formula (2), and 1 mole of hydrogen is generated for 2 moles of electric charge.

$$2H^+ + 2e^- \rightarrow H_2 \tag{2}$$

The amounts of the oxygen consumption and the hydrogen generation caused by the current sweep can be estimated from the FC current=Ifc at which the current is swept, and the reaction formulas (1) and (2). Since the volume of the sealed cathode and the initial cathode pressure are already known, the oxygen consumption amount and the hydrogen production amount can be converted into pressure. Assuming that all of the electric charges are used for consumption of the oxygen, the estimated pressure value of the cathode due to the oxygen consumption (hereinafter also referred to as "oxygen consumption pressure") Pox changes as shown by the chain line in FIG. 3. Assuming that all of the electric charges are used to generate hydrogen, the estimated pressure value of the cathode due to hydrogen generation (hereinafter also referred to as "hydrogen generation pressure") Phg changes as shown by the two-dot chain line in FIG. 3.

The measured cathode pressure Pca shows convex right-downward trend in the graph. The state of the cathode pressure Pca can be classified into three states, a pressure drop state at the first stage of the process, a pressure equilibrium state at the middle stage of the process, and a pressure increase state at the last stage of the process. The pressure drop state is a state in which the pressure decreases as the number of oxygen molecules decreases due to the oxygen consumption reaction, and the cathode pressure Pca substantially matches with the oxygen consumption pressure Pox. In the pressure equilibrium state, the generation amount of the pumping hydrogen increases, whereas the oxygen consumption reaction rate decreases as the oxygen concentration decreases. This results in a pressure decrease with a gentle gradient. The pressure increase state is a state in which the generation of the pumping hydrogen becomes dominant causing the pressure to increase, and the cathode pressure Pca substantially matches with the hydrogen generation pressure Phg.

Therefore, by detecting the boundary between the pressure drop state and the pressure equilibrium state, it is possible to detect the time point at which the oxygen concentration of the cathode reaches to a low level and the pumping hydrogen starts to be generated. When the oxygen consumption process is executed until this time point, the oxygen consumption process can be effectively executed while suppressing generation of the pumping hydrogen. Detection of the boundary between the pressure drop state and the pressure equilibrium state may be executed by detecting the time point at which the difference between the cathode pressure Pca and the oxygen consumption pressure (estimated pressure value) Pox becomes larger than the determination threshold value Pth, for example.

In the oxygen consumption process (step S150), the boundary between the pressure drop state and the pressure equilibrium state (as the time point at which the oxygen concentration reaches to a low level and the pumping hydrogen starts to be generated) is detected by detecting the time point (time point to in FIG. 3) at which the difference between the cathode pressure Pca and the estimated pressure value (oxygen consumption pressure) Pox becomes larger than the predetermined determination threshold value Pth. The determination threshold value Pth may be set as a value that is larger than the measurement error ε of a pressure sensor used for measuring the cathode pressure Pca, that is, the supply-side pressure sensor 280a and the exhaust-side pressure sensor 280b in the present embodiment, and may be set to Pth=ε·Sp considering the safety factor Sp. It is desirable that the safety factor Sp is in the range of 1<Sp≤2, more desirably in the range of 1<Sp≤1.5, and further more desirably in the range of 1<Sp≤1.2. The determination threshold value Pth may be stored in the nonvolatile memory of the FC controller 720.

As described above, according to the first embodiment, the oxygen consumption process at the time of stopping the fuel cell system 10 is executed until the cathode pressure Pca at the sealed cathode becomes larger than the estimated pressure value Pox by more than the determination threshold value Pth. This configuration allows the oxygen consumption process to be sufficiently executed until the oxygen concentration remaining in the sealed cathode reaches to a low level, and the generation of the pumping hydrogen to be further suppressed by ending the oxygen consumption process at the time point of generating the pumping hydrogen due to the low oxygen concentration (initial stage of generation).

B. Second Embodiment

Figure 4:
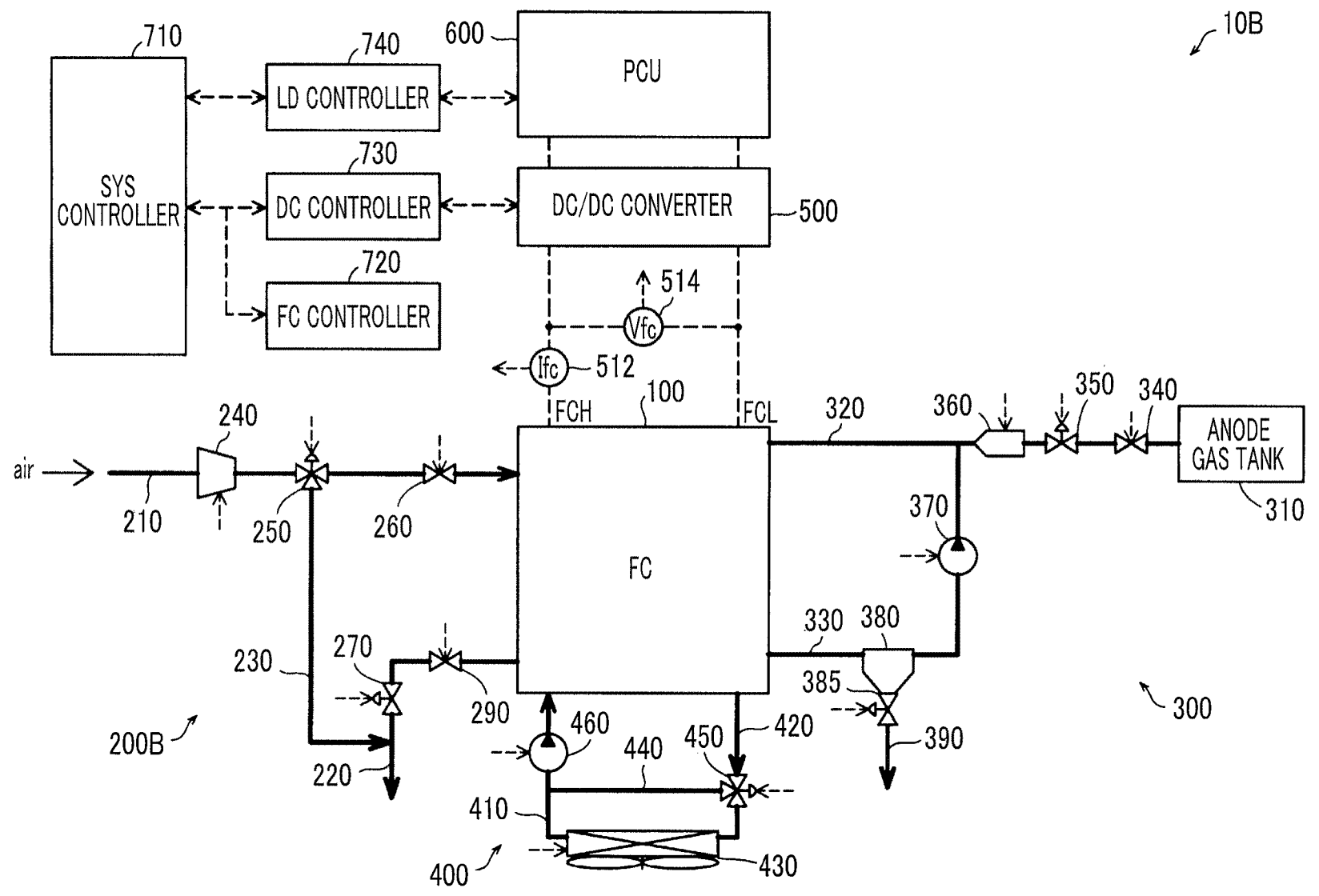

FIG. 4 is an explanatory diagram showing a schematic configuration of a fuel cell system 10B in the second embodiment. In the fuel cell system 10B, the cathode gas supply unit 200 (FIG. 1) of the fuel cell system 10 is replaced with a cathode gas supply unit 200B not having the supply-side pressure sensor 280a and the exhaust-side pressure sensor 280b, and the oxygen consumption process by the FC controller 720 is executed differently as will be described later. The other configuration of the fuel cell system 10B is the same as that of the fuel cell system 10 of the first embodiment.

Figure 5:
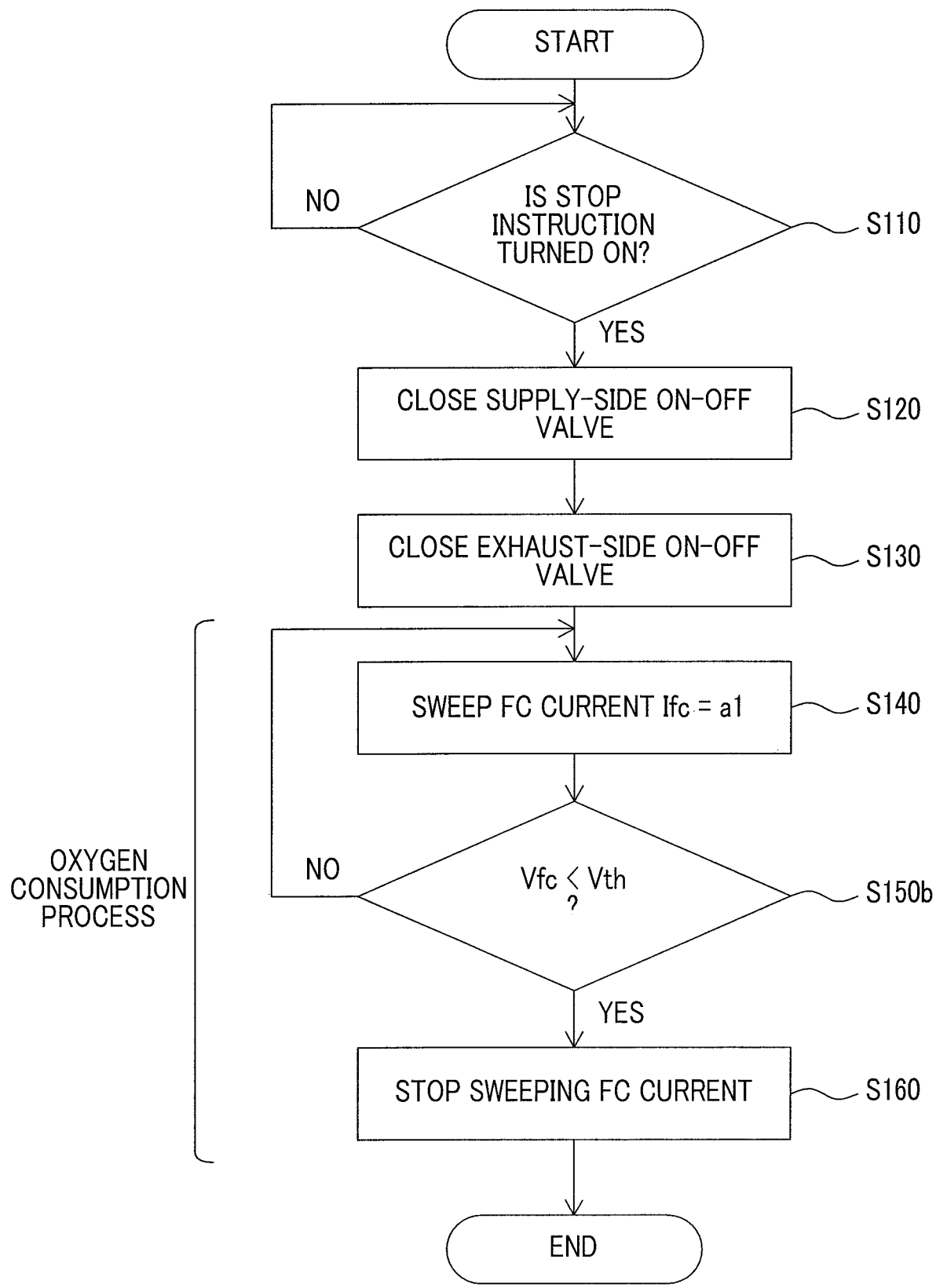
FIG. 5 is a flowchart showing a procedure of an oxygen consumption process executed at the time of stopping the fuel cell system.

FIG. 5 is a flowchart showing a procedure of the oxygen consumption process executed at the time of stopping the fuel cell system 10B. The processing is executed by the FC controller 720.

Similarly to the oxygen consumption process (FIG. 2) of the first embodiment, in a case where the stop instruction is turned ON (step S110: YES), the FC controller 720 closes the supply-side on-off valve 260 and the exhaust-side on-off valve 290 (steps S120, S130), seals the cathode of the fuel cell 100, and starts the oxygen consumption process by causing the current to be swept from the fuel cell 100 at the FC current Ifc=a1 (step S140).

Then, the FC controller 720 measures the FC voltage Vfc and determines whether or not the FC voltage Vfc has become less than a predetermined voltage threshold value Vth (step S150b). The FC voltage Vfc is measured by the FC voltage sensor 514 (FIG. 4). As long as the FC voltage Vfc is equal to or less than the voltage threshold value Vth (step S150b: NO), the FC controller 720 continues the current sweep in step S140. On the other hand, at the time point at which the FC voltage Vfc becomes larger than the voltage threshold value Vth (step S150b: YES), the FC controller 720 stops sweeping the FC current (step S160), and ends the oxygen consumption process.

Figure 6:
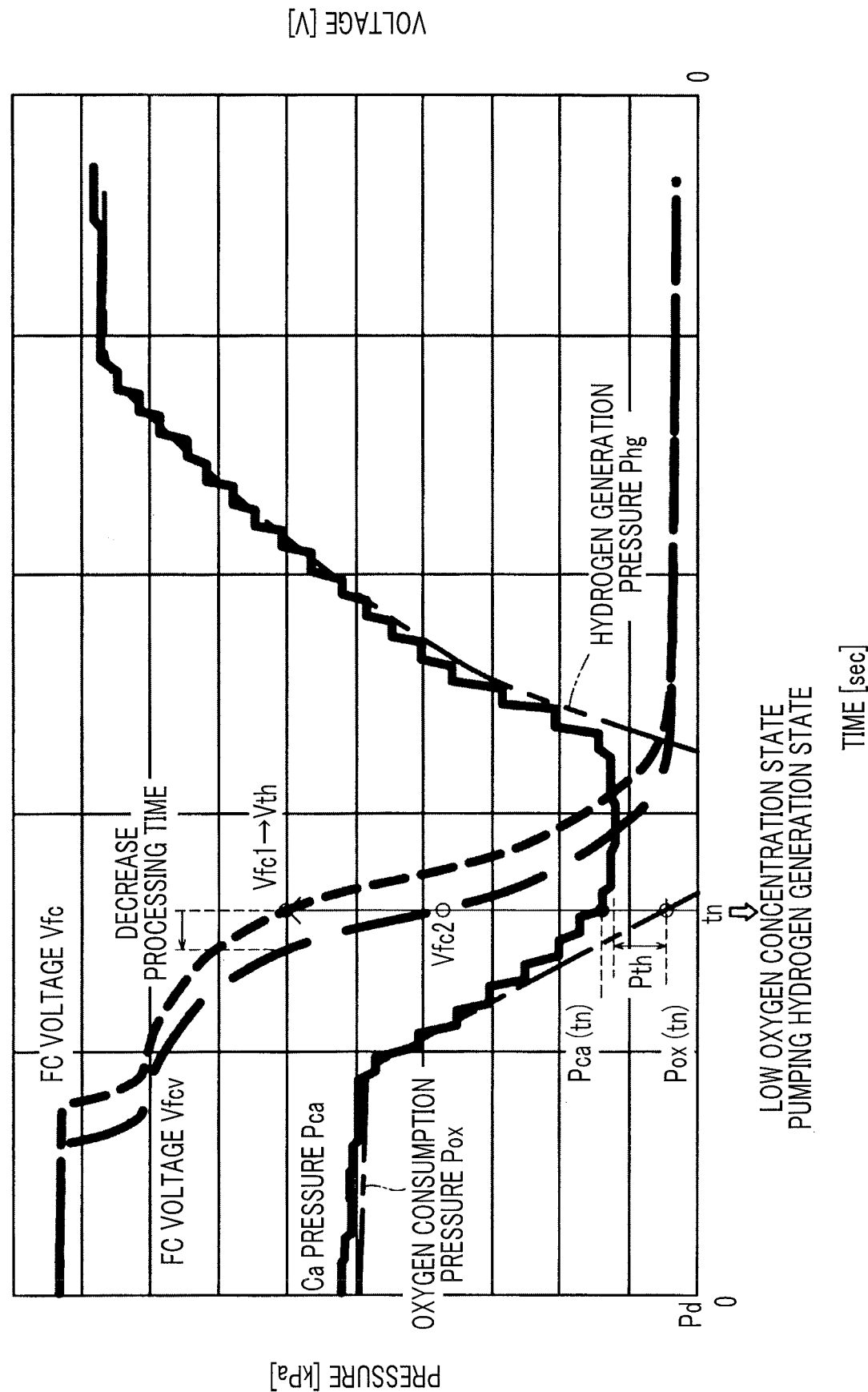
FIG. 6 is a graph showing how cathode pressure and FC voltage changes in the oxygen consumption process.

FIG. 6 is a graph showing how the cathode pressure Pca and the FC voltage Vfc changes in the oxygen consumption process. In FIG. 6, the FC voltage Vfc, the cathode pressure Pca, the oxygen consumption pressure Pox, and the hydrogen generation pressure Phg are the same as those in FIG. 3 except for an FC voltage Vfcv described later.

As shown in FIG. 4, the fuel cell system 10B of the second embodiment is not provided with the supply-side pressure sensor 280a and the exhaust-side pressure sensor 280b for measuring the cathode pressure Pca. Therefore, the fuel cell system 10B of the second embodiment cannot detect the boundary between the pressure drop state and the pressure equilibrium state obtained by measuring the cathode pressure Pca, that is, the time point at which the oxygen of the sealed cathode reaches a low level and the pumping hydrogen starts to generate, unlike the first embodiment.

Focusing on the FC voltage Vfc, as shown in FIG. 6, the FC voltage Vfc monotonously decreases correspondingly to the decrease in the cathode pressure Pca due to the oxygen consumption. In step S150b of FIG. 5, as shown in FIG. 6, the voltage value Vfc1 of the FC voltage Vfc at a time point to at which the difference between the cathode pressure Pca and the estimated pressure value Pox becomes equal to or larger than the determination threshold value Pth is set as the voltage threshold value Vth, and the FC controller 720 detects the time point at which the FC voltage Vfc becomes less than the voltage threshold value Vth. This configuration allows the FC controller 720 to indirectly detect the time point at which the difference between the cathode pressure Pca and the estimated pressure value Pox becomes larger than the determination threshold value Pth.

The voltage threshold value Vth may be acquired in advance as described below and stored in the nonvolatile memory of the FC controller 720. First, at least one of the supply-side pressure sensor 280a and the exhaust-side pressure sensor 280b same as those of the fuel cell system 10 of the first embodiment is disposed in the fuel cell system 10B of the second embodiment (FIG. 1). Then, similar to the oxygen consumption process (FIG. 2) in the first embodiment, while the supply-side on-off valve 260 and the exhaust-side on-off valve 290 are closed to seal the cathode, the FC controller 720 executes the oxygen consumption process to measure the changes in the FC voltage Vfc and the cathode pressure Pca and to obtain the corresponding oxygen consumption pressure Pox (see FIG. 6). Then, the FC controller 720 acquires the value Vfc1 of the FC voltage Vfc at the time point at which the difference between the cathode pressure Pca and the estimated pressure value Pox becomes equal to or larger than the determination threshold value Pth (see FIG. 6) and sets the value as the voltage threshold value Vth. This configuration allows the FC controller 720 to obtain the voltage threshold value Vth in advance.

As described above, in the second embodiment, the oxygen consumption process at the time of stopping the fuel cell system 10B is executed until the time point at which the FC voltage Vfc becomes less than the voltage threshold value Vth. This configuration allows the FC controller 720 to indirectly detect the time point at which the difference between the cathode pressure Pca and the estimated pressure value Pox becomes larger than a determination threshold value Pth in the sealed cathode, and thus to execute the oxygen consumption process until this time point. As a result, as in the case of the first embodiment, the FC controller 720 is allowed to sufficiently execute oxygen consumption process until the oxygen concentration remaining in the sealed cathode reaches a low level, and to end the oxygen consumption process at a time point at which the pumping hydrogen starts to be generated due to reaching low oxygen concentration (initial stage of generation), thereby achieving further suppression of generation of the pumping hydrogen.

There are cases where the voltage variation in the unit cells is caused by characteristic variation in the plurality of unit cells constituting the fuel cell 100, consequently resulting in variation in the FC voltage Vfc. For example, in a case where the voltage of the fuel cell 100 decreases faster than the FC voltage Vfc, as shown as the FC voltage Vfcv (long broken line) in FIG. 6, the FC voltage Vfcv becomes the voltage value Vfc2 that is less than the voltage value Vfc1 corresponding to the time point tn at which the difference between the cathode pressure Pca and the estimated pressure value Pox becomes equal to or larger than the determination threshold value Pth. In this case, in a case where the determination in step S150b of FIG. 5 is performed according to the voltage threshold value Vth set to the voltage value Vfc1, the oxygen consumption process may end at the time point earlier than the original time point tn and decrease the process time, which consequently may reduce the oxygen consumption amount. Conversely, although not shown in drawings, in a case where the gradient of the voltage decrease becomes gentle, the processing time may be prolonged and thus increase the amount of pumping hydrogen to be generated.

As described above, in the oxygen consumption process of the second embodiment, fluctuation in processing time may occur, and thus the effect of the oxygen consumption process obtained from the viewpoint of the sufficient oxygen consumption process and suppression of generation of the pumping hydrogen may be weakened as compared with the oxygen consumption process of the first embodiment. However, the oxygen consumption process of the second embodiment enables detection of the timing to end the oxygen consumption process and to end the oxygen consumption process by monitoring the FC voltage, without requiring the cathode pressure to be measured to obtain the oxygen consumption pressure (estimated pressure value due to oxygen consumption) unlike the first embodiment. Therefore, even in the fuel cell system not having the supply-side pressure sensor 280a and the exhaust-side pressure sensor 280b as in the second embodiment, easy detection of the time point of ending the oxygen consumption process is realized.

In the above description, the value Vfc1 of the FC voltage Vfc at the time point at which the difference between the cathode pressure Pca and the estimated pressure value Pox becomes equal to or larger than the determination threshold value Pth is set as the voltage threshold value Vth. In consideration of the variations in the FC voltage Vfc, the voltage threshold value Vth may be set as Vth=Vfc1·Sv using the safety factor Sv. The safety factor Sv is desirably set within the range of 0<Sv≤1 in consideration of the balance between the oxygen consumption amount and the pumping hydrogen generation amount.

C. Other Embodiments

The present disclosure is not limited to the above-described embodiments, and can be implemented in various modes without departing from the gist of thereof, and can be implemented in the following forms, for example.

(1) In the above embodiments, in the cathode gas supply pipe 210, in a case where the flow dividing valve 250 can shut off the flow of the cathode gas from the flow dividing valve 250 to the cathode side of fuel cell 100, the flow dividing valve 250 may be used as a supply-side on-off valve, and the supply-side on-off valve 260 may be omitted. Similarly, in the cathode gas exhaust pipe 220, in a case where the pressure-regulating valve 270 can shut off the flow of the cathode off-gas to a downstream side of the pressure-regulating valve 270, the pressure-regulating valve 270 may also be used as an exhaust-side on-off valve and the exhaust-side on-off valve 290 may be omitted.

(2) The above embodiments that have been described had a configuration in which the FC controller 720 for controlling the operation of the fuel cell 100, the DC controller 730 for controlling the operation of the DC/DC converter 500, the LD controller 740 for controlling the operation of the PCU 600, and the SYS controller 710 for generally controlling the above-described controllers 720, 730, 740 are separately provided. However, the present disclosure may also employ a configuration in which the SYS controller includes the controllers 720, 730, 740.

(3) In the first embodiment, it has been described that the cathode pressure Pca may be obtained by averaging the pressure value P1 measured by the supply-side pressure sensor 280a and the pressure value P2 measured by the exhaust-side pressure sensor 280b. As described above, the pressure value P1 measured by the supply-side pressure sensor 280a and the pressure value P2 measured by the exhaust-side pressure sensor 280b are basically the same. The pressure value P2 measured by the exhaust-side pressure sensor 280b or the pressure value P1 measured by the supply-side pressure sensor 280a may be set as the cathode pressure Pca. The sensor not used for measurement of the cathode pressure Pca may be omitted.

(4) In the above-described embodiment, a fuel cell system mounted on the vehicle has been described as an example, but the present disclosure is not limited thereto, and can also be applied to a fuel cell system that is mounted on a various mobile objects such as a ship and an airplane that use electric power as a power source of a power generation device (drive motor). The present disclosure can be applied to a fuel cell system mounted on a mobile object and also to a stationary fuel cell system.

The present disclosure is not limited to the above-described embodiments, examples, and modified examples, and can be realized in various configurations without departing from the gist thereof. For example, replacement, combination, or the like can be made as appropriate in order to solve some or all of the above-mentioned problems or in order to achieve some or all of the above-mentioned effects, the technical features in the embodiments, examples, and modification examples corresponding to the technical features in each embodiment described in "SUMMARY". Unless its technical features are described as indispensable in the description, it can be deleted as appropriate.

What is claimed is:

1. A fuel cell system comprising:
    a fuel cell that generates power using a reaction between a fuel gas supplied to an anode and an oxidizing gas supplied to a cathode;
    an anode gas supply unit configured to supply the fuel gas to the anode;
    a cathode gas supply unit configured to supply the oxidizing gas to the cathode;
    a supply-side on-off valve configured to stop supplying the oxidizing gas to the cathode by the cathode gas supply unit;
    an exhaust-side on-off valve configured to shut off cathode off-gas exhausted from the cathode; and
    a controller configured to control the anode gas supply unit, the cathode gas supply unit, the supply-side on-off valve, and the exhaust-side on-off valve to control power generation of the fuel cell,
    wherein the controller is configured to, to stop the fuel cell system,
        (a) execute an oxidizing gas consumption process by supplying the fuel gas to the anode and sweeping current in a continuous manner from the fuel cell while the supply-side on-off valve and the exhaust-side on-off valve are closed to seal the remaining oxidizing gas in the cathode, and
        (b) stop the sweeping of the current in the continuous manner at a time point at which a difference between pressure of the cathode and an estimated pressure value of the cathode becomes larger than a predetermined determination threshold value to end the oxidizing gas consumption process, wherein the estimated pressure value of the cathode is based on an oxygen consumption in the fuel cell.

2. The fuel cell system according to claim 1, wherein the controller is configured to
    store, as a voltage threshold value, an output voltage of the fuel cell corresponding to the time point at which the difference between the pressure of the cathode and the estimated pressure value of the cathode becomes larger than the predetermined determination threshold value in advance, and
    detect the time point at which the difference between the pressure of the cathode and the estimated pressure value of the cathode becomes larger than the predetermined determination threshold value by detecting a time point at which the output voltage of the fuel cell becomes less than the voltage threshold value to stop the sweeping of the current.

* * * * *